United States Patent Office.

CHARLES CHAUNCY PARSONS, OF NEW YORK, N. Y.

Letters Patent No. 104,343, dated June 14, 1870.

IMPROVEMENT IN PURIFYING ALCOHOL AND SPIRITS.

The Schedule referred to in these Letters Patent and making part of the same.

*To whom it may concern:*

Be it known that I, CHARLES CHAUNCY PARSONS, of the city, county, and State of New York, have invented a certain new and useful Process of Purifying Alcohol and other Spirits, of which the following is a specification.

My invention is based upon the use of paraffine to effect the purification of alcohol or other spirits; and It consists in a process of purifying alcohol or spirits by vaporizing the same, and passing the vapors, previous to condensation, through, or otherwise subjecting them to the action of melted paraffine, by which means the purification of the alcoholic or spirituous vapor is quickly and readily effected.

To carry out my invention, I employ a suitable closed vessel or apparatus filled with melted paraffine, through which the alcohol or spirit, in the form of vapor, and before condensation, is caused to pass, by being introduced into the lower part of the vessel through a suitable pipe or conduit, and forced, by its own pressure, up and through the paraffine.

The paraffine may be placed above an alcoholic column, or it may be by itself in a tight vessel, or in a series of such vessels, through which the alcohol will bubble up.

In practice I prefer to introduce the melted paraffine by a trap-pipe on top of a mass of pumice-stone, or similar substance, broken or otherwise reduced into small pieces, through the interstices of which the vapor will pass in a finely-divided state, and I thus give it a prolonged exposure to the action of the paraffine.

Fresh paraffine may be introduced, as required, from time to time through the trap-pipe, the spent paraffine and the condensed alcohol being drawn off from the vessel by a faucet suitably arranged in the bottom.

The alcohol or other spirit may, by these means, be subjected more or less to the action of the paraffine, and may be passed through one or more vessels containing the latter material, the alcohol being in the form of vapor, and the paraffine in a melted state until the close of the operation.

The vapors, having passed through the paraffine, are condensed by the usual means, and the spent paraffine may be recovered by letting it and the water drawn from the still with which it is mixed, remain quiet for a little time, when the paraffine will rise to the top, and may then be drawn or skimmed off, or otherwise separated from the water, and it can then be cleaned or purified for future use by passing superheated steam through it.

I have described the manner in which I prefer to carry my invention into effect, but it is obvious that many forms of apparatus may be employed to effect the same result without departing from the principle of my invention.

I do not, therefore, limit myself to the details herein described; nor do I confine myself to what is termed paraffine, for there are other oily substances which have no taste or smell, and yet have a sufficiently high boiling-point to prevent their being vaporized by the alcohol, and exert the same purifying action, such, for instance, as "Merrill's neutral oil," so called; but

What I claim, and desire to secure by Letters Patent, is—

The method of purifying alcohol and other spirits by vaporizing the same, and passing the vapors through, or otherwise subjecting them to the action of melted paraffine, or the equivalent thereof, previous to condensation, substantially as set forth.

In testimony whereof I have signed my name to this specification before two subscribing witnesses.

CHARLES CHAUNCY PARSONS.

Witnesses:
   A. POLLOK,
   M. BAILEY.